March 30, 1926.  1,578,749

A. E. NORRIS

RAIL CLAMPING MECHANISM

Filed August 2, 1923  2 Sheets-Sheet 1

Inventor:
Almon E. Norris.

March 30, 1926.

A. E. NORRIS 1,578,749

RAIL CLAMPING MECHANISM

Filed August 2, 1923   2 Sheets-Sheet 2

Inventor:
Almon E. Norris.
by Emery Booth Janney Varney
Attys.

Patented Mar. 30, 1926.

1,578,749

UNITED STATES PATENT OFFICE.

ALMON E. NORRIS, OF BROOKLINE, MASSACHUSETTS.

RAIL-CLAMPING MECHANISM.

Application filed August 2, 1923. Serial No. 655,301.

*To all whom it may concern:*

Be it known that I, ALMON E. NORRIS, a citizen of the United States, and a resident of Brookline, in the county of Norfolk and State of Massachusetts, have invented an Improvement in Rail-Clamping Mechanism, of which the following description, in connection with the accompanying drawings, is a specification, like characters on the drawings representing like parts.

This invention relates to rail clamping mechanism, being more particularly, though not exclusively, intended for use in connection with conveying bridges, traveling cranes or similar structures.

The invention will be best understood by reference to the following description when taken in connection with the accompanying illustration of one specific embodiment thereof, while its scope will be more particularly pointed out in the appended claims.

In the drawings,—

Figure 1:
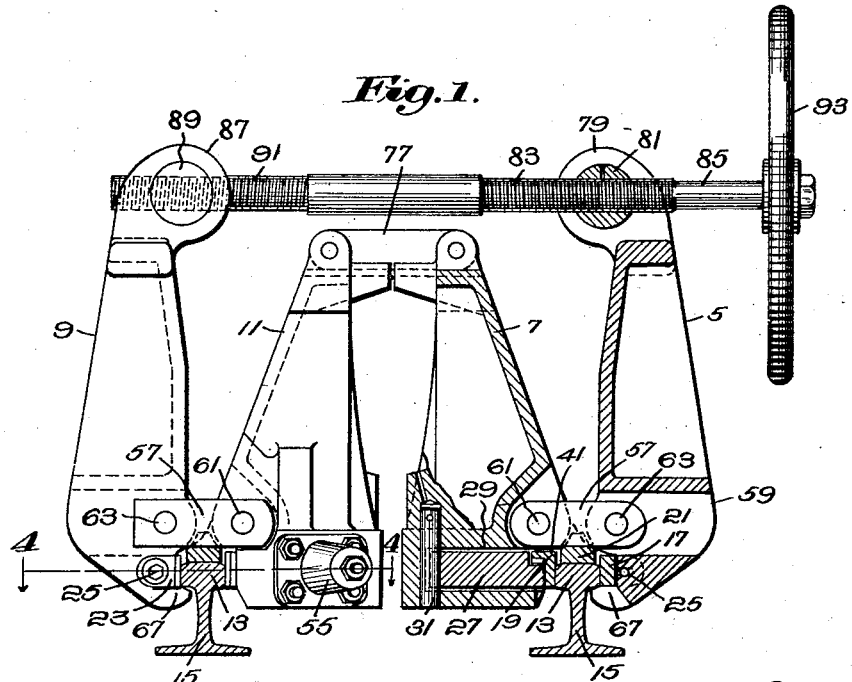
Fig. 1 is an end elevation, partly in section, showing the principal parts of a rail clamping mechanism embodying one form of the invention, the clamping parts being shown in their closed or applied position.

Referring to the drawings and to the embodiment of the invention which is there selected for purposes of exemplification, there is shown a rail clamping mechanism comprising two pairs of opposed and relative movable jaws, one pair consisting of the jaws 5 and 7, and the other of the jaws 9 and 11, the jaws of each pair being disposed on opposite sides of, and with their active or clamping ends operatively related to, the flange 13 of a rail 15.

The jaws 5 and 9 and the jaws 7 and 11 are similarly constructed and provided with substantially similar working parts, and, for the purposes of description, only the jaws 5 and 7 and the parts associated therewith will be described in detail. It is also to be understood that while I have herein shown pairs of jaws constituting a double clamping device, the invention may be embodied in a single clamp comprising merely a single pair of jaws, such as the jaws 5 and 7, operatively related to a single rail 15.

Figure 4:
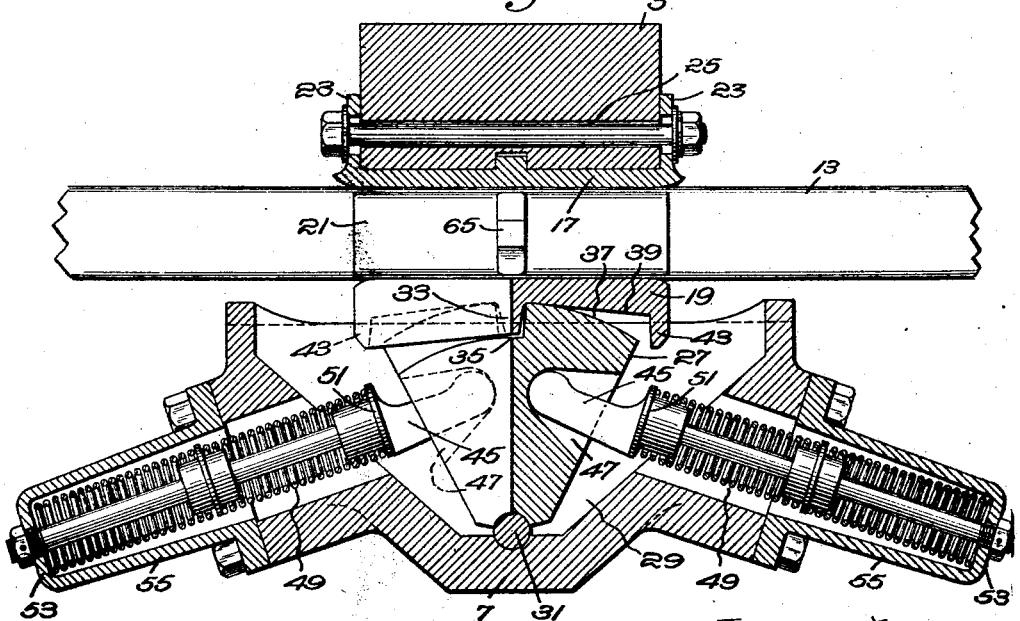
Fig. 4 is a sectional plan on the line 4—4 in Fig. 1 showing on an enlarged scale the clamping devices carried by one pair of clamping jaws.

Herein the jaws 5 and 7 (and similarly the jaws 9 and 11) are provided with shoes 17 and 19 which engage opposite sides of the rail flange 13, while a shoe 21, which rests loosely on the top of the rail, assists in supporting the jaws. In the illustrated form of the invention, the shoe 17 is adjustable to compensate for wear as well as being renewable, and to that end is provided with slotted ears 23 (see Fig. 4) which receive a bolt 25 extending through the jaw 5 and securing the shoe thereto. The shoe 19 is likewise renewable.

The clamping is accomplished by moving the jaws toward each other and closing them about the rail flange, thereby bringing the shoes firmly into contact with the opposite sides respectively of the rail flange, this being accomplished by mechanism hereinafter described. Assuming the shoe 19 is pressed firmly against the side of the rail, the construction of the clamp is such as to provide for the automatic self-tightening of the clamp to increase the gripping action in the event that there is any tendency of the clamp and the connected structure to move lengthwise the rail in either direction.

To this end, the inner shoe 19 is under the control of a rocker or cam shaped member 27 (Figs. 1 and 4) which is located in a recess 29 in the jaw 7 and is fulcrumed at its inner end on an upright pin 31 fixed in the jaw.

Suitable connection is provided between the shoe and the movable cam rocker, whereby the movement of one is accompanied by movement of the other, the shoe being provided for this purpose with a tooth 33 which engages a notch 35 in the opposed face of the rocker. This opposed face 37 presents a working surface which is concentric with its fulcrum, while the shoe 19 presents a cooperating working surface 39 which is inclined in two directions with relation to the rail engaging surface of the shoe,—that is to say, the shoe increases in thickness from its central portion toward its ends, but the working surface 39 of the shoe preferably diverges somewhat from the working surface 37 of the rocker, the parts being so related and shaped that any movement of the rocker forces the shoe with increased pressure against the rail flange and under a very great force due to the cam action of the rocker.

The shoe 19 is supported by a flange 41 (see Fig. 2) overlying the edge of the rocker, which flange, together with the end projections 43 (see Fig. 4) operatively related to the sides of the rocker, assist in excluding dirt and other foreign matter, the projections 43 also serving as stops to limit the lengthwise travel of the shoe.

The rocker cam 27 is normally maintained in central position by the opposed centering plungers 45 engaging recesses 47 provided in the sides of the rocker and urged in generally opposite directions by springs 49 having their inner ends seated against abutments 51 on the plungers, and their outer ends against abutments 53 presented by chambered caps 55 secured to the jaw 7. The plungers protrude through the ends of the caps and are adapted to move longitudinally through the same as the springs yield.

Figure 3:
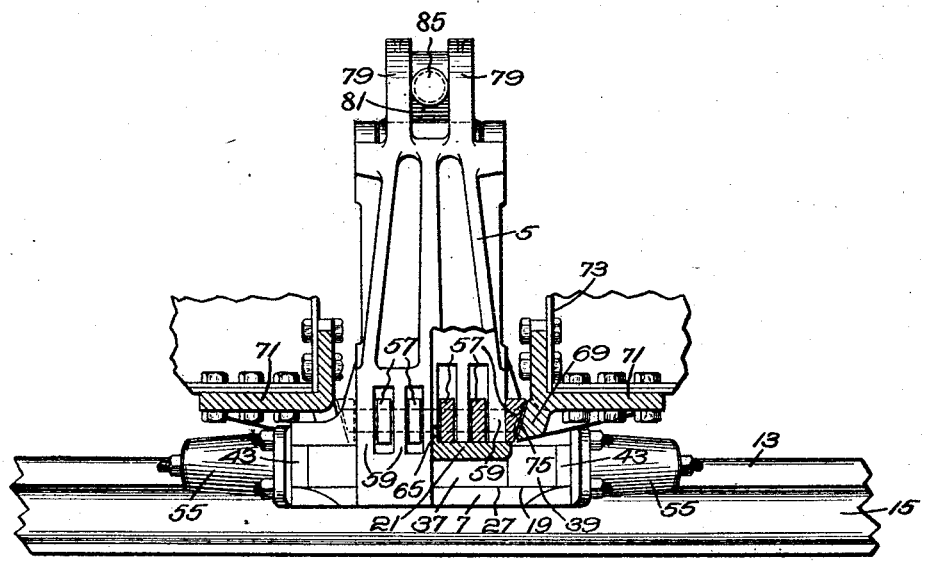
Fig. 3 is a side elevation, partly in section, of the clamping mechanism shown in Fig. 1.

The jaws 5 and 7 are connected to each other by one or more, and herein a plurality, of connecting links 57 which, as shown in Fig. 3, alternate with ears 59 formed on the jaws. Rods 61 and 63 extending transversely through the ears and links provide pivots for the latter. The ears 59 for the jaw 7 rest upon the supporting shoe 21 and the links 57 also rest upon the shoe and thereby support the jaw 5. A lug 65 (Fig. 4) formed on the central portion of the shoe 21 and extending between two of the links compels the shoe to travel with the jaws as the structure moves along the rail.

Assuming that the jaw 5 is swung to a closed position, bringing the shoe 17 against the side of the rail, any further closing pressure acts through the links 57 to bring the shoe 19 into contact with the opposite side of the rail and thereafter to bring equal pressure to bear on both sides of the rail.

Figure 2:
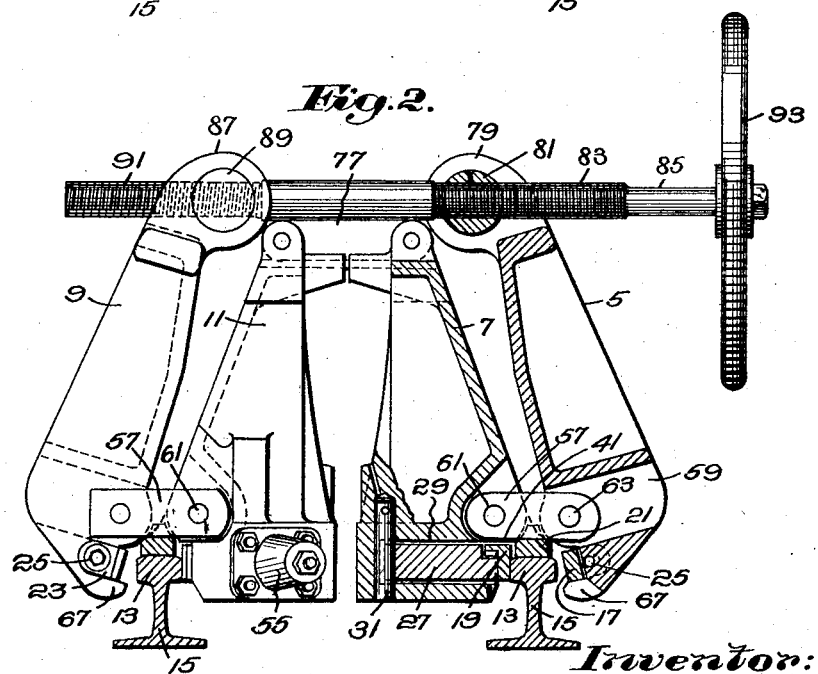
Fig. 2 is a view similar to Fig. 1 showing the clamping parts in their open position.

Referring to Figs. 1 and 2, the tip of the jaw 5 is provided with an underlying lug 67 which projects beneath one side of the rail flange and prevents the clamp from being lifted from the rail should the truck or structure carrying the clamp have any lifting tendency. To cause the clamp to hold the structure against such lifting tendency, the movable jaws 5 are mounted (see Fig. 3) between fixed jaws or abutments 69 which are carried by a member 71 secured to a frame 73. The confronting edges of the fixed abutments are beveled, as at 75, and the adjacent links 57 are correspondingly beveled, thereby preventing the abutments 69 and the attached frame members from lifting to a greater extent than what is permitted by the position of the rail clamp.

The clamping mechanism described is designed particularly for attachment to the trucks of a traveling conveyor bridge of a general construction well known in the art. The bridge itself is omitted for sake of clearness and a fragmentary part 73 only of the truck frame is herein shown, the rest being broken away. It will be understood, however, that the clamping devices, located, as they are, between the inclined abutments 69 of the truck frame, are carried along by the latter as the bridge travels from point to point, the clamping devices receiving their support from the rail 15 through the supporting shoe 21. When the clamp is closed and set, any lateral or lifting movement of the truck and its structure is prevented by the truck frame abutments 69 with the cooperating parts of the clamp.

When the jaws are closed about the rail and the shoe 19 on the jaw 7 is brought into firm gripping contact with the rail, any tendency of the bridge structure to shift its position lengthwise the track from any cause whatever will act to move the jaw 7 along the track flange and, since the shoe 19 is held in frictional engagement with the track, this in turn immediately rocks the movable cam member 27 about its fulcrum 31, automatically increasing the gripping pressure of the shoe because of the shape of the cooperating working surfaces 37 and 39 of the cam and the shoe respectively. Accordingly, any tendency of the structure to move in either direction when the clamp is properly set automatically increases the resistance of the clamp to displacement and in proportion to the force which is tending to cause such displacement.

If a clamp of this character fails to hold properly, disastrous results may follow and the action of such a clamp should be certain under all conditions. In a self-tightening clamp of this character, it is desirable that when the clamp is set the jaws should be positively closed in every instance in order that the self-tightening clamping member, such as the shoe 19, shall have initially a firm, unyielding grip under the full force of the jaw closing mechanism. Owing to varying rail dimensions, or for other reasons, clamps of the self-tightening character, when apparently closed and set by their jaw actuated mechanism, are in fact but imperfectly so because the contact of the self-tightening member with the rail is insufficient to cause the clamp to function properly and certainly at all times in respect to its automatic tightening feature. To obviate this I have herein provided means whereby, at the will of the operator, the clamping mechanism herein shown may be set or initially applied at all times with a variable setting, and with the jaws in variable clamping position to accommodate varying rail dimensions, such variable setting being positive and unyielding and under the full force of the clamp applying mechanism.

Referring to the clamp actuated mechanism, the upper end of the jaw 7 is pivotally supported, herein being connected to the corresponding end of the jaw 11 by the connecting link 77. The upper end of the jaw 5 is provided with upstanding ears 79 between which is fixedly secured a part, such as the short rod or piece of shafting 81, which is threaded to receive a threaded portion 83 of the screw shaft 85. The upper end of the corresponding jaw 9 of the remaining pair is provided with similar ears 87 and a similar threaded member 89, the latter having engagement with the threaded portion 91 of the screw shaft 85. The portions 83 and 91 are oppositely threaded so that when the shaft is turned in one direction the jaws are closed, as shown in Fig. 1, and when turned in the opposite direction the jaws are opened as shown in Fig. 2. Power means may be utilized for turning the shaft 85 if desired, but herein the same is provided at its outer end with a hand wheel 93. By turning the hand wheel the jaws may be closed, in the position shown in Fig. 1, and a powerful leverage exerted in bringing the shoe 19 into firm, unyielding, frictional engagement with the rail. The threaded portions of the screw shaft 85 are of sufficient extent to provide for variable positions of the jaws when closed and to provide for applying to the jaws the same, full, positive closing force under all conditions irrespective of varying rail dimensions. By this means the rail clamp can be repeatedly set up and all uncertainty avoided as to whether its initial grip on the rail is sufficient to insure its proper function.

While I have herein shown for purposes of illustration one specific embodiment of the invention, it is to be understood that the same is not limited to the detailed features of construction herein shown or to the relative arrangement of parts, but that extensive deviations may be made, all without departing from the spirit of the invention.

I claim—

1. A device for securing a structure to a rail, comprising opposed pivotally mounted jaws operatively related to opposite sides of the rail, self-tightening clamping devices carried by one of the jaws and including a movable cam member adapted, when said jaws are moved to apply the clamping devices, to be moved through the frictional engagement of a jaw carried part with the rail to increase the grip of the jaws therein as the structure tends to move in either direction along the rail, connected mechanism comprising a screw which may be turned to close or open said jaws, said screw being movable at the will of the operator to move the jaws toward the rails to variable positions of positive setting with relation to the rail to meet varying rail dimensions, and a hand operated device for turning said screw.

2. A device for securing a structure to a pair of rails, comprising pairs of opposed jaws, one pair operatively related to the opposite sides of each rail, one jaw of each pair being pivotally mounted for movement toward and away from its rail, a link pivotally connecting the remaining jaw of each pair to the first mentioned jaw a screw having threaded engagement with the free ends of each pivotally mounted jaw and adapted to be turned to move said jaws toward or away from each other, thereby to close or open said pairs of jaws and to move the jaws toward the rails to variable positions of positive setting with relation to the rail to meet varying rail dimensions, means for turning said screw, a self-tightening clamping device carried by one of the jaws of each pair and including a movable cam member adapted when said jaws are closed to be moved through the frictional engagement of the jaw carried part on the rail when the structure tends to move in either direction along the rail, and thereby to increase the grip of the jaws thereon.

3. In a rail clamp, the combination with a jaw, of a clamping device adapted when applied to automatically increase its grip on movement in either direction lengthwise the rail, a second operatively related jaw having a link connection to the first jaw and having a prolonged end, movement of which is adapted to open and close the jaw, an operating shaft having a threaded engagement with the prolonged end of said jaw, and means for turning said shaft to release the clamp or to positively apply the same with variable positions of setting.

4. A device for securing a structure to a rail comprising clamping means, and including a device automatically responsive to movement of the structure in either direction for forcing a gripping pressure of the clamping means against the rail, and a manually operated screw controllable by the operator at will for unyieldingly moving said clamping means to positions of variable setting and in clamping position with relation to the rail.

In testimony whereof, I have signed my name to this specification.

ALMON E. NORRIS.